Oct. 10, 1961 A. HENTSCHKE 3,003,827
BALL GUIDE FOR AXIALLY MOVABLE MACHINE
PARTS WITH SMALL AXIAL STROKE
Filed April 27, 1960

United States Patent Office 3,003,827
Patented Oct. 10, 1961

3,003,827
BALL GUIDE FOR AXIALLY MOVABLE MACHINE PARTS WITH SMALL AXIAL STROKE
Alfons Hentschke, Frankfurt am Main, Germany, assignor to SKF Kugellagerfabriken G.m.b.H., Schweinfurt, Germany
Filed Apr. 27, 1960, Ser. No. 25,157
Claims priority, application Germany Apr. 28, 1959
7 Claims. (Cl. 308—6)

The invention is concerned with a ball guide for axially movable machine parts with small axial stroke.

Rapidly reciprocating movements of sometimes a few millimeters only occur quite often in engineering. The general development tends to substituting ball guides for the conventional sliding guides formerly used for these purposes. However, in spite of numerous advantages, such as very small friction and, thus, the requirement of a small power for moving the shaft, as well as little wear, the ball guides known so far are not as good as the sliding guides with respect to noiselessness. The high requirements made with respect to noiselessness by the textile industry, for instance, cannot be met by the known bearing sleeves having rotating rows of balls; for the balls, above all if they are not loaded, cause a considerable noise, and this noise is the larger the faster the stroke changes.

It is the object of this invention to provide a ball guide for axially movable machine parts with small axial stroke, which operates in a very noiseless manner even if the stroke is changing rapidly.

It is a further object of the invention to provide a ball guide for axially movable machine parts with small axial stroke, which has small radial dimensions and allows a relatively large number of rows of balls to be accommodated.

A further object of the invention is the provision of a ball guide which is constructed in a simple way and can readily be installed.

A further object of the invention is the provision of a ball guide, the balls of which are loaded at continuously changing places so that the balls possess a long working life.

A further object of the invention is the provision of a ball guide wherein the balls are biased in axial direction.

A ball guide according to the invention comprises a shaft and a machine part arranged coaxially and moving in axial direction relative to each other, a plurality of balls being mounted in rows between the shaft and said machine part and contacting an outer cylindrical bearing sleeve and the surface of the shaft or of an inner bearing sleeve connected to the shaft, and further comprises resilient members arranged at the ends of the rows of balls in such a manner that the balls are prestressed or biased towards the middle of each row.

A more complete understanding of the details of the invention may be had by reference to the accompanying drawings.

Figure 1:
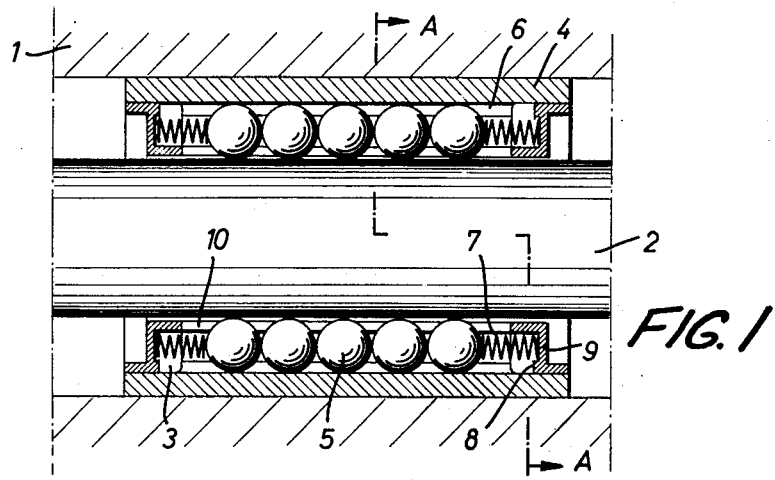
FIG. 1 is a longitudinal sectional view through a ball guide according to the invention.

In FIG. 1 only a part of the shaft 2 and the surrounding part 1 of a machine is shown. Said part 1 surrounds the shaft 2 with a clearance so that a ball guide 3 may be mounted between these two parts. In the arrangement shown the shaft is axially movable relative to the part of the machine. The new ball guide, however, may also be used in cases where the shaft is fixed and the machine part can be axially reciprocated. In both cases the relative axial displacements of the two parts are very small, for example a few millimeters.

Figure 2:
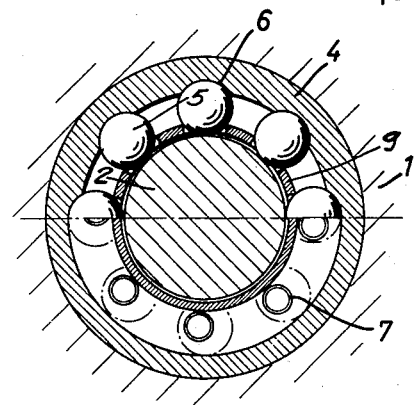
FIG. 2 is a cross-sectional view on line A—A of FIG. 1.
Figure 3:
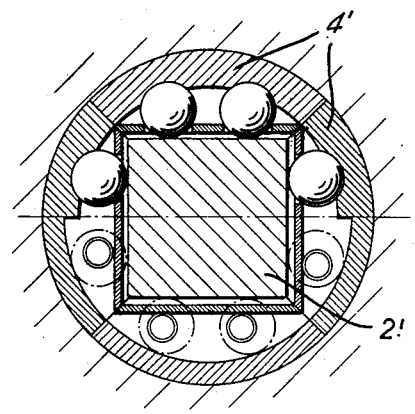
FIG. 3 is a corresponding cross-sectional view of a ball guide, wherein the shaft is, as an example, constructed as a four-cornered shaft.

The ball guide 3 comprises an outer bearing sleeve 4 which is connected to said machine part 1, and a plurality of bearing balls 5 which are arranged in a number of circumferentially spaced rows (see FIGS. 2 and 3). There are shown eight rows of five balls each, but it must be understood that the number of rows and/or balls may vary without departing from the scope of the present invention.

As may be seen from the figures, the balls of each row are partly received by axially extending tracks 6 provided on the inner surface of said outer bearing sleeve 4. For retaining the balls in their tracks, there are provided cage means formed by a sleeve 9 surrounding the shaft 2 at a small distance. The sleeve 9 has circumferentially spaced slots 10 extending in an axial direction and having widths smaller than the diameters of said balls so that the balls may partly extend through the slots for contacting the inner bearing surface.

In the arrangement, shown, the inner bearing surface contacted by the balls is provided by the outer surface of the shaft which, for this reason, is hardened and ground. A separate inner bearing sleeve, however, may be provided and fixed to the shaft.

The cage 9 is provided with end flanges 8, as shown in FIG. 1, which may be connected to the outer bearing sleeve 4 for limiting the axial movement of the balls 5. At both ends of each row resilient members, such as coil-type or compression springs 7, are provided, the ends of which bear against said flanges 8 of said cage 9 and against the end ball of each row, respectively, so as to bias the balls of each row in a direction from both ends towards the middle portion of that row.

When the shaft reciprocates, the balls may, thus, freely follow these movements. At any moment of this movement the balls are positively forced into contact with each other so as to prevent the balls from clicking against each other when the direction of movement is being changed. This clicking is the main cause for creating a noise in the axial shaft guiding arrangement.

The resilient elements may be formed of any suitable spring elements such as helical springs or cup springs. They may be made of any resilient and oil-resisting material such as metal or plastic material.

The resilient elements 7 may be arranged in such a manner as to contact the end balls of each row at points which are, in a circumferential direction, displaced with respect to that diameter of the end balls which is parallel to the axis of the shaft 2. With this arrangement, the balls are eccentrically loaded to a certain extent and, thus, are given a spin in their movement. Due to this spin, the balls are always forced into contact with one side of each track 6 in the outer bearing sleeve 4. This sleeve 4 may be provided with at least one axial slot or may be made of two or more segments 4', as shown in FIG. 3, so as to facilitate the mounting of the arrangement, especially in cases where the shaft 2' has a cross-section deviating from a circle. The other elements of the embodiment shown in FIG. 3 are identical or similar to those of FIGS. 1 and 2.

If desired, the inner bearing surface co-operating with the balls also may be provided with guiding tracks for the balls, such as those shown in connection with the outer bearing sleeve 4.

As the ball guides according to the invention do not require back-guidings, the outer bearing sleeve may be constructed in a very simple manner. Due to the rows of unloaded balls being eliminated, the number of balls is considerably reduced, the carrying capacity remaining the same. As compared to ball bearing sleeves with tangential back-guidings, a greater number of rows of carrying balls may be accommodated. The resilient elements provided at the ends of the ball rows allow the balls to be displaced only slightly in the axial direction and, at the same time, act as noise-damping means. If these elements or springs are so arranged as to exert an eccentrically engaging load on the balls, a spin is caused which is transferred to all balls in the directions towards the middle of the rows and which brings about that the balls do not always contact the tracks along the same lines of their peripheries. This prevents the stress from being exerted always on the same points. Alternatingly all points of the ball peripheries are used to bear the load and this prevents an early fatigue of the balls.

I claim:

1. A ball guide for limited axial movement of a shaft relative to a machine part surrounding said shaft with a radial clearance, comprising a plurality of balls arranged in rows between said shaft and said machine part and contacting an outer bearing sleeve and an inner bearing surface of said shaft, resilient elements mounted at both ends of each of said rows of balls for biasing said balls, and an inner retainer sleeve extending axially between said shaft and said balls and having longitudinal slots therein of a width smaller than the diameters of said balls for retaining said balls when said shaft is moved out of said ball guide, said retainer sleeve having radial flanges at both ends for supporting the outer ends of said resilient elements.

2. A ball guide according to claim 1, wherein said outer bearing sleeve comprises an axial track for each of said rows of balls on the inner surface of said sleeve and extending in axial direction.

3. A ball guide according to claim 1, wherein said outer bearing sleeve is provided with at least one axial slot.

4. A ball guide according to claim 1, wherein said outer bearing sleeve is formed of at least two segments.

5. A ball guide for small axial movements of a shaft relative to a machine part surrounding said shaft with a radial clearance, comprising a plurality of balls arranged in rows between said shaft and said machine part and contacting an outer bearing sleeve and an inner bearing surface on said shaft, and resilient elements mounted at both ends of each of said rows of balls for biasing said balls in a direction from said ends of said rows towards their middle portions, said resilient elements engaging the end balls of each of said rows eccentrically with respect to those diameters of said end balls which extend parallel to the axis of said shaft.

6. A ball guide according to claim 5, wherein said resilient elements are compression springs bearing with one of their ends against said end balls of said rows of balls.

7. A ball guide according to claim 5, wherein said resilient elements are made of an oil-resisting plastic material.

References Cited in the file of this patent

UNITED STATES PATENTS

| | | |
|---|---|---|
| 2,174,325 | Large | Sept. 26, 1939 |
| 2,269,254 | Cribb | Jan. 6, 1942 |
| 2,833,598 | Sloyan | May 6, 1958 |
| 2,844,044 | Cole | July 22, 1958 |